US008099399B2

(12) United States Patent
Wilkinson et al.

(10) Patent No.: US 8,099,399 B2
(45) Date of Patent: Jan. 17, 2012

(54) DETERMINING WHETHER CHANGE IN WORKLOAD OF DATABASE SYSTEM HAS OCCURRED, AND/OR WHETHER EXECUTING CURRENT WORKLOAD WILL LIKELY RESULT IN PROBLEM DEVELOPING WITH DATABASE SYSTEM

(75) Inventors: William K. Wilkinson, Sunnyvale, CA (US); Harumi Kuno, Cupertino, CA (US); Goetz Graefe, Madison, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 12/509,704

(22) Filed: Jul. 27, 2009

(65) Prior Publication Data
US 2011/0022586 A1 Jan. 27, 2011

(51) Int. Cl.
*G06F 17/30* (2006.01)

(52) U.S. Cl. ...................................................... 707/688

(58) Field of Classification Search .................. 707/688, 707/703, 705, 706, 720, 802; 718/100, 105
See application file for complete search history.

(56) References Cited

U.S. PATENT DOCUMENTS

| | | | |
|---|---|---|---|
| 7,028,301 B2* | 4/2006 | Ding et al. | 718/104 |
| 7,523,286 B2* | 4/2009 | Ramany et al. | 711/170 |
| 8,005,809 B2* | 8/2011 | Buckler | 707/705 |
| 2010/0083264 A1* | 4/2010 | Mehta et al. | 718/103 |
| 2010/0094827 A1* | 4/2010 | Mehta et al. | 707/705 |

OTHER PUBLICATIONS

S. Krompass et al., "Dynamic workload management for very large data warehouses . . . ," Procs. of 33rd Int'l Conf. on Very Large Data Bases, 2007.
O. Ozmen et al., "Storage workload estimation for database management systems," Procs. of ACM SIGMOD Int'l Conf. on Management of Data, 2007.
Internet web pages from web site http://www.csim.com, accessed from Internet Jul. 19, 2009.
J. Hamilton, "Four techniques to help service owners sleep full nights" presentation slides, Conf. on Innovative Data Systems Research, Jan. 4-7, 2009.
Tandem Capacity Model (TCM) Manual, Aug. 2008.
G. Luo et al., "A non-block parallel spatial join algorithm," Procs. of 21st Int'l Conf. on Data Eng'g, Apr. 2005.
S. Chaudhuri et al., "Estimating progress of execution for SQL queries," in Procs. of 2004 ACM SIGMOD Int'l Conf on Management of Data, year 2004.
B. Niu et al., "Workload adaptation in autonomic DMBSs," Procs. of 2006 Conf. of Center for Advanced Studies on Collaborative Research, year 2006.

(Continued)

*Primary Examiner* — Cam-Linh Nguyen (57) ABSTRACT

Whether a change in workload of a database system has occurred can be determined. Investigative queries are formulated. Each investigative query is adapted to test a different resource or a different combination of resources of the database system. The investigative queries are run when the database system is in an unloaded state to acquire unloaded performance metrics. The investigative queries are run when the database system is in a loaded state to acquire loaded performance metrics. Whether executing a current workload of the database system, using a current configuration of the database system, will likely result in a problem developing at a later point in time can also be determined. Simultaneously with actual execution of the current workload on the database system using the current configuration, a simulation of execution of the current workload using the current configuration is performed. The simulation is performed more quickly than the actual execution.

15 Claims, 8 Drawing Sheets

OTHER PUBLICATIONS

I. Subramanian et al., "Meeting performance goals with the HP-UX workload manager," Procs. of 1st Conf. on Industrial Experiences with Systems Software, year 2000.

"The SQL Server 2000 Workload Governor," Internet web site http://msdn.microsoft.com/en-us/library/aa224554(SQL.80).aspx , Jan. 2004.

"Managing resource allocation with Oracle database resource manager," Chapter 25 of Oracle Database Administrator's Guide, 11g Release 1 (11.11), Mar. 2008.

Teradata Dynamic Workload Manager User Guide, Release 06.02.00, B035-2513-096A, Sep. 2006.

* cited by examiner

DETERMINING WHETHER CHANGE IN WORKLOAD OF DATABASE SYSTEM HAS OCCURRED, AND/OR WHETHER EXECUTING CURRENT WORKLOAD WILL LIKELY RESULT IN PROBLEM DEVELOPING WITH DATABASE SYSTEM

BACKGROUND

A database is a structured collection of data stored within a computing system. To retrieve desired data from the database, a corresponding query is formulated and ultimately run against the database. When at any given time different types of queries are permitted to be run against the database without limitation of the types that can be run, the current workload of the database is said to be a heterogeneous workload. By comparison, when at any given time just the same types of queries are permitted to be run against the database, the current workload of the database is said to be a homogeneous workload.

DETAILED DESCRIPTION

As noted in the background section, the current workload of a database system can be heterogeneous or homogeneous. From the standpoint of the administrator of the database system, forcing workloads to be homogeneous is advantageous. This is because such homogeneous workloads impart a high degree of predictability in assessing how hardware resources of the database system are being used, and in determining whether a problem will occur with the database system, such as database overload, whereas heterogeneous workloads do not. One way to ensure homogeneous workloads is to enforce time slicing, where different types of queries can only be run against a database during certain times. The workload of a database includes the work that is performed in relation to the database to run queries against the database, as well as the work that is performed to achieve other tasks, such as index maintenance, report generation, data summarization, backups, and so on.

From the standpoint of an end user of the database system, permitting the workloads of the database system to be heterogeneous is desirable. This is because the end user can then run any type of query against the database at any time. By comparison, if time slicing is enforced, the user has to wait until the certain times when a given type of query is permitted to be run in order to run this type of query. As such, the needs of the end user in being able to run any type of query at any given time compete with the needs of the administrator in being able to predict how hardware resources of the database system are being used when running queries against the database and whether a problem will occur with the database system when running such queries.

Embodiments of the present disclosure provide a way to assess how hardware resources of a database system are being used in running queries against a database, and whether a problem will likely occur with the database system in running such queries, even when the current workload of the database system is heterogeneous. In particular, investigative queries can be used to determine whether a change in the workload of a database system has occurred. Usage rates of resources of the database system when running the investigative queries within a loaded state of the system are compared to usage rates of the resources when running the investigative queries within an unloaded state of the system. An administrator can use this information regarding the change in the workload of a database system to ensure that end user objectives are satisfied.

Furthermore, simultaneously with the actual execution of the current workload of the database system, a simulation of the execution of the current workload of the database system can be performed. The simulation is performed more quickly than the actual execution is. The simulation can thus indicate whether a problem will likely occur during the actual execution of the current workload, before the problem actually occurs. Performing the simulation simultaneously with the actual execution of the current workload is beneficial, because the actual execution does not have to wait for the simulation to be finished before starting. Any problem is likely to be detected before the actual execution of the current workload has reached the point in time at which the simulation indicates that a problem will likely occur.

Figure 1:
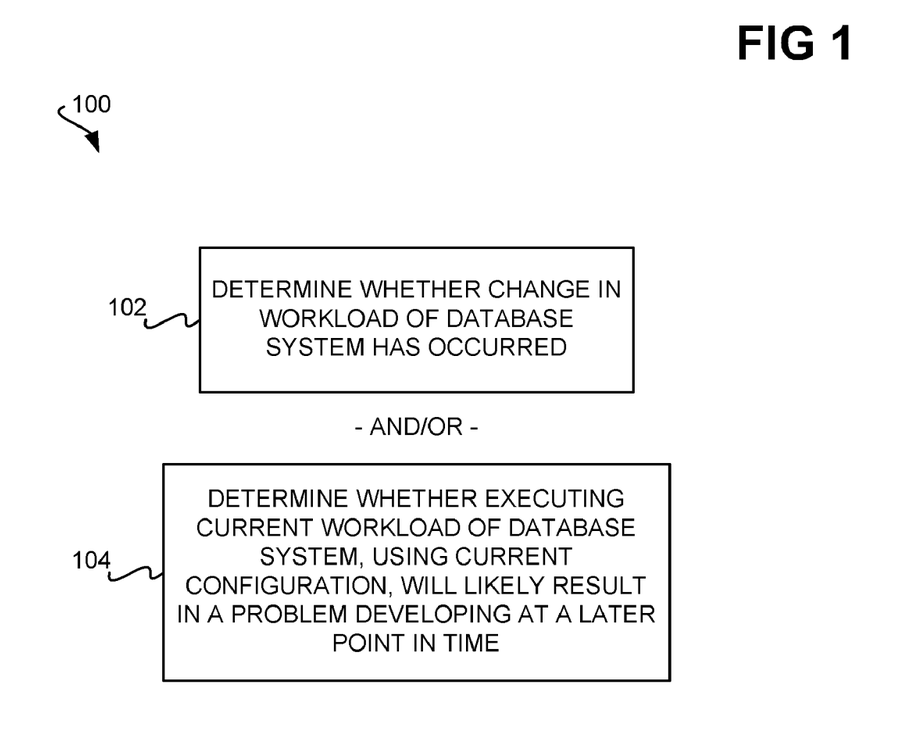
FIG. 1 is a flowchart of a method, according to an embodiment of the present disclosure.

FIG. 1 shows a method 100, according to an embodiment of the disclosure. Like the other methods of embodiments of the disclosure, the method 100 may be implemented as one or more computer programs stored on one or more computer-readable media. The computer-readable media may be non-volatile media, such as magnetic media like hard disk drives and non-volatile semiconductor memory like flash memory, as well as volatile media, such as volatile semiconductor memory like dynamic random access memory, and/or other types of computer-readable media. One or more processors of one or more computing devices execute the computer programs to perform the method 100.

The method 100 determines whether a change in the workload of a database system has occurred (102), and/or determines whether executing the current workload of a database system, using a current configuration of the database system, will likely result in a problem developing at a later point in time (104). As noted above, the workload of a database includes the work that is performed in relation to the database to run queries against the database, as well as the work that is performed to achieve other tasks, such as index maintenance, report generation, data summarization, and so on. In at least one embodiment, the workload can be specified in terms of the number of queries, or other database operations such as query plans, that the database is currently processing for a given time period.

Especially in the context of a heterogeneous workload, determining whether a change in the workload of the database system has occurred is advantageous. Such changes indicate how the database system is being used, which is a useful metric to track to ensure that the database system is properly configured to optimally perform the workload. Such change also can be indicative of how the resources of the database system are being used. These resources can include hardware resources, such as non-volatile storage allocated to the database like hard disk drives, volatile storage allocated to the database like dynamic random access memory, the number and speed of the processors allocated to the database, the number of processor cycles allocated to the database, and so on. As such, the resources of the database system can be properly tuned to its workload.

The configuration of the database system can be generally defined as a specification of the operating environment in which a workload is executed. As such, the configuration can include the number, type, and arrival rates of queries that are to be run on the database system at any given time. The configuration can also or alternatively include workload management policies that are enforced for admitting, scheduling, and executing queries, as well as the parameters that are set for compiling and executing query plans, among other types of parameters. It is noted that a database system still has a heterogeneous workload even if the number and type of queries that are permitted to be run at any given time is restricted, so long as more than one type of query is permitted to be run at any given time. For example, a representative configuration may specify that a certain number X of online transaction processing (OLTP) queries are permitted to run at the same time as a certain number Y of business intelligence (BI) analytical queries generated in the process of creating a business intelligence report.

Especially in the context of a heterogeneous workload, determining whether executing the current workload of a database system, using the current configuration of the database system, will likely result in a problem developing at a later point in time is advantageous. The current configuration may be changed to an alternative configuration, so that the problem will not actually develop. For example, a representative alternative configuration may specify that just 90% of the certain number X of OLTP queries are permitted to run at the same time as just 90% of the certain number Y of BI queries. If it is determined that the alternative configuration will also likely result in a problem developing at a later point in time, the alternative configuration may be changed as well, before the problem actually develops.

Figure 2:
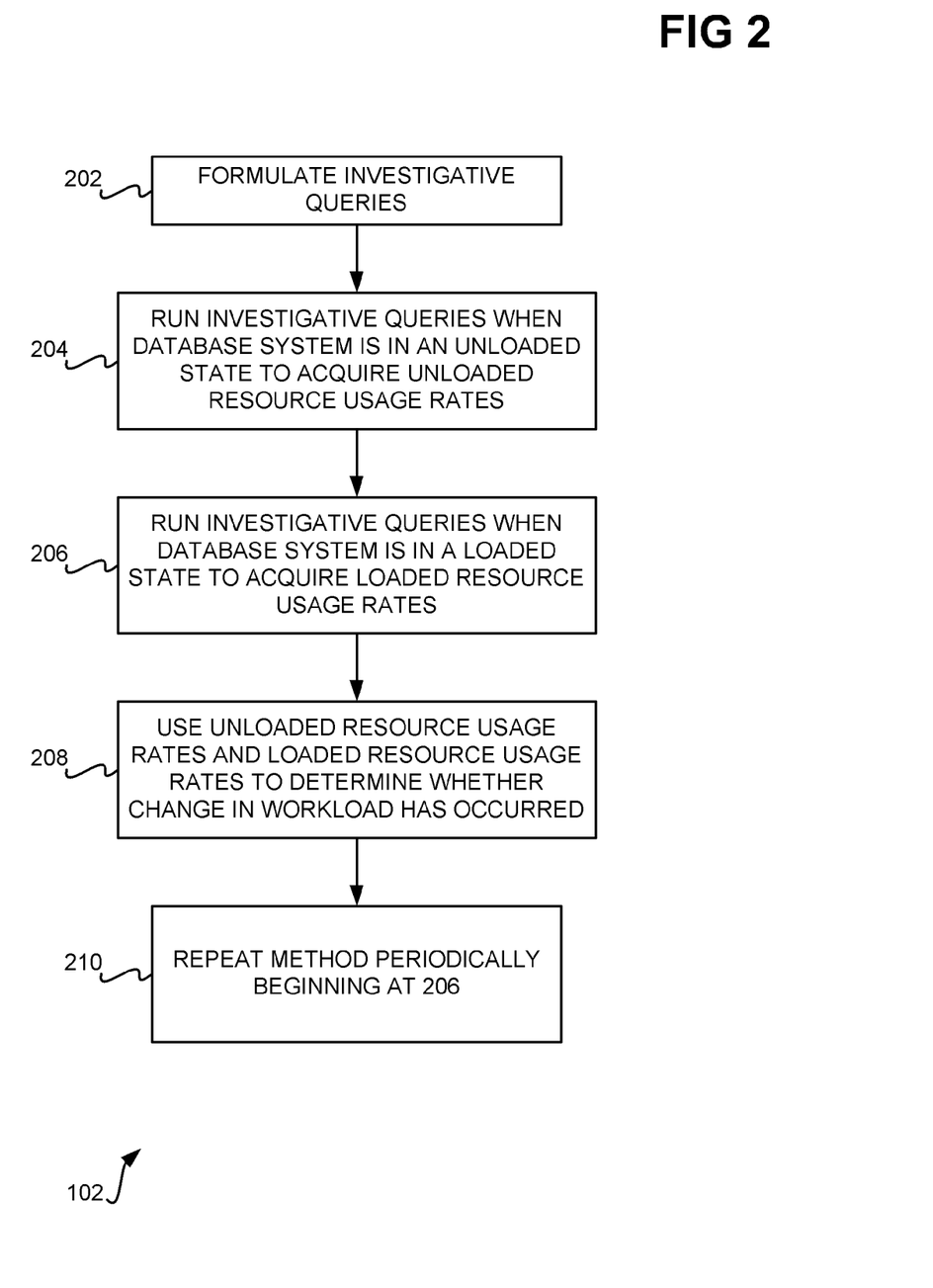
FIG. 2 is a flowchart of a method for determining whether a change in the workload of a database system has occurred, to implement the first part of FIG. 1, according to an embodiment of the present disclosure.

FIG. 2 shows a method for how whether a change in the workload of a database system has occurred can be determined in part 102 of the method 100, according to an embodiment of the disclosure. One or more investigative queries are formulated (202). The investigative queries may also be referred to as canary queries. Each investigative query is adapted to test a different resource of the database system. As such, an investigative query is not adapted to explicitly return data from the database system.

Therefore, whereas an end user formulates a query to explicitly return requested data from the database, an investigative query does not have this purpose, even though it may nominally request that data be returned. The purpose of an investigative query is rather to test a particular resource of the database system, or more than one more particular resource in combination. The nominal data that may be returned from running this query may be inconsequential to this purpose, and is not the reason why the investigative query was formulated, in contradistinction to a more standard query. It is noted that the term query is used to generally refer to any database operation; that is, a query may in fact modify the database, by updating, deleting, or adding data, and is not to be construed as just a read-only operation. Such an inclusive definition of what a query is applies to both queries that a user generates, as well as to investigative queries.

For example, an investigative query may be formulated to test whether there is sufficient volatile memory allocated to the database system to perform table sorts of tables of a relatively large size. Another investigative query may be formulated to test whether there are sufficient processor cycles allocated to the database system to perform complex searches within a desired period of time. A third investigative query may be formulated to test whether there is sufficient non-volatile storage allocated to the database system to store a certain number of database records. Embodiments of the disclosure can use these and other types of investigative queries.

The investigative queries are run once, when the database system is in an unloaded state (204), to acquire unloaded resource usage rates. The database system is in an unloaded state when no other queries, except for the investigative queries, are being run on the database system, where the investigative queries are generally successively run one at a time. However, the database system on which the investigative queries are run is the same instance of the database system on which end user queries will be subsequently run, when the database system is said to be in a loaded state.

A given investigative query being run on the database system in the unloaded state results in a resource usage rate corresponding to the resource to which the given investigative query has been adapted to test, which is referred to herein as the unloaded resource usage rate for this resource. An example of a resource usage rate is the amount of resources employed to process the query, over time, such as processor cycles per second. Another example of a resource usage rate that may also or alternatively be used is the ratio of work that is performed over such resource usage, such as the number of tuples output, or processed, per processor cycle. A third example of a resource usage resource is the percentage of maximum utilization of a resource over time. The unloaded resource usage rates corresponding to investigative queries as a whole provide a baseline metric against which subsequently acquired resource usage rates can be compared.

It is noted that a resource usage rate is one type of performance metric that can be used, and is exemplarily described herein as representative of all the types of such performance metrics that can be used. For example, another type of performance metric is response time, which is the time it takes to process a query and return a response to the query. In general, then, while the resource usage rate is used herein as a specific type of performance metric, other embodiments can use other types of performance metrics, in addition to or in lieu of the resource usage rate.

The investigative queries are then run when the database system is in a loaded state (206), to acquire loaded resource usage rates. The database system is in a loaded system when other queries, besides the investigative queries, are being run on the database system. Thus, once the investigative queries have been run on the database system in the unloaded state, end users are permitted to run queries to request desired data, such that the database system is then in a loaded state. When the database system is in such a loaded state, the investigative queries are again run in part 206.

A given investigative query being run on the database system in the loaded state results in a resource usage rate corresponding to the resource to which the given investigative query has been adapted to test, which is referred to herein as the loaded resource usage rate for this resource. The loaded resource usage rates can then be compared to the unloaded resource usage rates. Specifically, both the loaded and the unloaded resource usage rates are used to determine whether a change in the workload of the database system has occurred (208).

The method of FIG. 2 is repeated periodically beginning at part 206 (210). The investigative queries are thus periodically rerun on the database system in the loaded state, particularly when the loaded state of the database system has changed. Periodically rerunning the investigative queries on the database system in the loaded state provides for updated loaded resource usage rates to be acquired, so that whether a change in the workload of the database system has occurred due to the loaded state of the database system having changed can be determined. It is noted, however, that the investigative queries are run on the database system in the unloaded state just a single time in one embodiment, to provide a baseline metric against which subsequently acquired and/or updated loaded resource usage rates can be compared.

Figure 3:
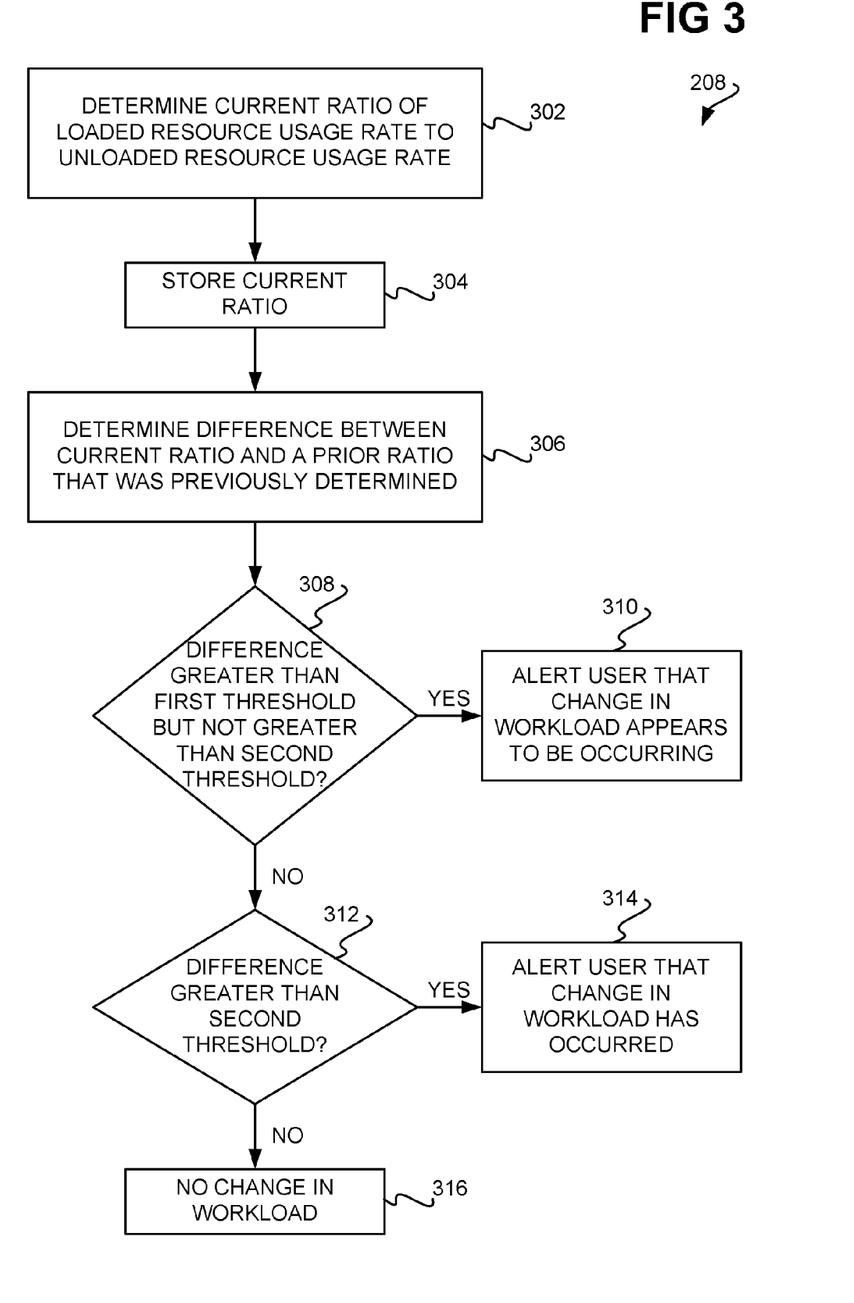
FIG. 3 is a flowchart of a method for using unloaded resource usage rates and loaded resource usage rates to determine whether a change in the workload of a database system has occurred, to implement a given part of FIG. 2, according to an embodiment of the present disclosure.

FIG. 3 shows a method for how the unloaded resource usage rates and the loaded resource usage rates can be used in part 208 of the method of FIG. 2 to determine whether a change in the workload of the database system has occurred, according to an embodiment of the disclosure. The method of FIG. 3 is performed for the resource to which each investigative query corresponds. The current ratio of the most recently determined loaded resource usage rate to the unloaded resource usage rate of the resource in question is determined (302), and stored for subsequent retrieval (304). As noted above, other types of performance metrics, in addition to or in lieu of the resource usage rate, may be employed.

The difference between the current ratio and a prior ratio that was previously determined is determined (306). The prior ratio that is subtracted from the current ratio is typically the ratio that was determined most recently before the current ratio was determined. However, the prior ratio may alternatively be an unloaded ratio—i.e., equal to the number of one—which is the ratio of the unloaded resource usage rate to itself. In general, the difference between the current ratio and any ratio that was determined in the past is determined in part 306. The difference is compared against a first threshold and a second threshold. The second threshold is greater than the first threshold. In at least some embodiments, both the thresholds are positive, and not negative. In some embodiments, the difference between the current ratio and a prior ratio that is evaluated is the absolute value of the actual positive or negative difference between the current ratio and the prior ratio.

In this specific embodiment in which the difference is compared against a first threshold and a second threshold, then, if the difference is greater than the first threshold but is not greater than the second threshold (308)—that is, if the difference is between the first and second thresholds—then the user is alerted that a change in the workload appears to be occurring (310). A change in the workload may be defined as the workload increasing (or decreasing) by more than a certain amount or percentage represented by the second threshold. However, before the change in the workload has increased by this certain amount or percentage, it may be useful to know that it appears that such a change is forthcoming. Thus, where the workload has changed by less than the certain amount or percentage represented by the second threshold, but has changed by greater than a different certain amount or percentage represented by the first threshold, the user is alerted that an actual predefined change in the workload appears to be occurring, although it may not ultimately occur.

If the difference is greater than the second threshold (312), then, the user is alerted that a change in the workload has occurred (314). That is, the workload has increased (or decreased) by the certain amount or percentage represented by the second threshold, where a change in the workload is defined by such an increase (or decrease). If the difference is not between the first threshold and the second threshold (308), and is not greater than the second threshold (308), then this implies that the difference is less than the first threshold. As such, it is stated that no change in the workload of the database system has yet occurred (316), or is currently occurring.

The second threshold can be determined by the user based on the user's notion of what certain amount or percentage is considered a change in the workload. The first threshold can be determined by the user based on how much in advance the user wants to receive notification that a change in the workload is likely occurring. The closer that the first threshold is to the second threshold, the less advance warning the user will receive that a change in the workload appears to be occurring, but the greater the degree in certainty that the change will actually occur. By comparison, the farther that the first threshold is from the second threshold, the more advance warning the user will receive that a change in the workload appears to be occurring, but the lesser the degree in certainty that the change will actually occur.

It is noted that more generally, any type of formulation that uses the difference between the current ratio and a prior ratio may be employed, in addition to or in lieu of comparing the difference against a first threshold and a second threshold as has been described. That is, the manner by which the difference between the current ratio and the prior ratio is employed to determine whether a change in the workload appears to be occurring or has occurred is not limited to the approach described above, in which a first threshold and a second threshold are employed. For example, other embodiments may employ other types of comparisons. For example, one embodiment can use the relative value of the difference, instead of the absolute value of the difference. Another embodiment may employ one of a number of different types of approaches to analyze the performance of the investigative queries. These other approaches may be implemented using separate software tools, which are invoked as needed in the method 300. In general, then, the difference is analyzed, or used, to determine the current performance of the database system.

Figure 4:
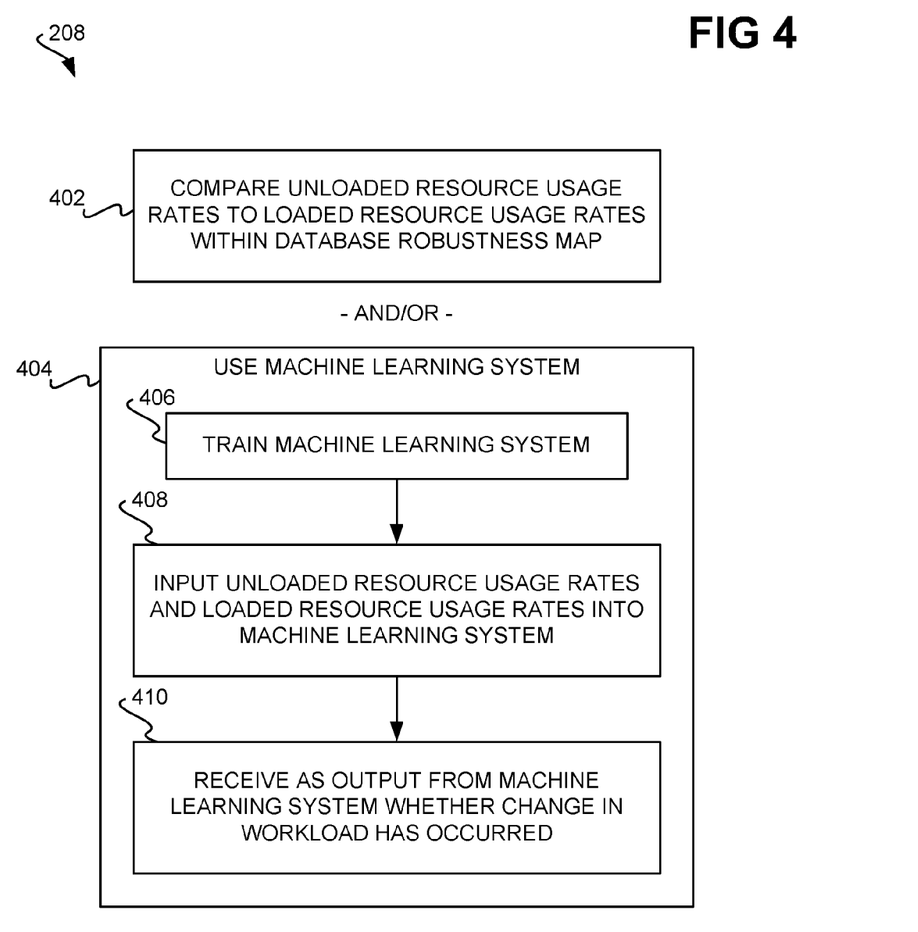
FIG. 4 is a flowchart of a method for using unloaded resource usage rates and loaded resource usage rates to determine whether a change in the workload of a database system has occurred, to implement the given part of FIG. 2, according to another embodiment of the present disclosure.

FIG. 4 shows two other approaches for how the unloaded resource usage rates and the loaded resource usage rates can be used in part 208 of the method of FIG. 2 to determine whether a change in the workload of the database has occurred, according to an embodiment of the disclosure. The approaches of FIG. 4 can be used individually or together. Furthermore, the approaches of FIG. 4 can be, together or individually, used in addition to or in lieu of the method of FIG. 3. These approaches are exemplary of representative techniques that can be used, and are not intended to provide an exhaustive and comprehensive list of all such techniques. It is thus explicitly noted that embodiments of the present disclosure can use techniques other than those that are explicitly described herein to determine whether a change in workload of the database has occurred, using the unloaded resource rates and the loaded resource usage rates.

First, the unloaded resource usage rates for the resources to which the investigative queries corresponds can be compared to the loaded resource usage rates within a database robustness map (402), to determine whether a change in the workload of the database system has occurred. A database robustness map is a graph mapping resource usage rates to workload, for a given resource of a database system. How such a database robustness map can be constructed is described in the previously filed and commonly assigned patent application entitled "Evaluation of database performance using robustness mapping of a representative set of fundamental queries," filed on Feb. 2, 2009, and assigned Ser. No. 12/364,086. By comparing the loaded and the unloaded resource rates for a resource against a database robustness map for this resource, whether the workload of the database system has changed can thus be determined.

Second, a machine learning system can be used (404), to determine whether a change in the workload of the database system has occurred. The machine learning system is initially trained using a number of training queries and a number of corresponding resource usage rates, both loaded and unloaded, corresponding to the training queries (406). After the machine learning system has been trained, the unloaded resource usage rates and the loaded resource usage rates are input into the machine learning system (408), and whether a change in the workload has occurred is received back from the machine learning system (410).

In this respect, the machine learning system embodiment of part 404 can be considered as a more sophisticated version of method of FIG. 3. Rather than having a straightforward comparison of a current ratio to a prior ratio of the loaded resource usage rate to the unloaded resource usage rate against various thresholds, as in FIG. 3, the machine learning system embodiment of part 404 permits more complex evaluations to be performed to determine whether a change in the workload has occurred. The nature of these evaluations is dependent on the type of machine learning system that is employed. For example, in a Bayesian machine learning system, complex statistical correlations among the resource usage rates that are difficult to discern from outside the machine learning system are determined, to ultimately assess whether a change in the workload has occurred.

Figure 5:
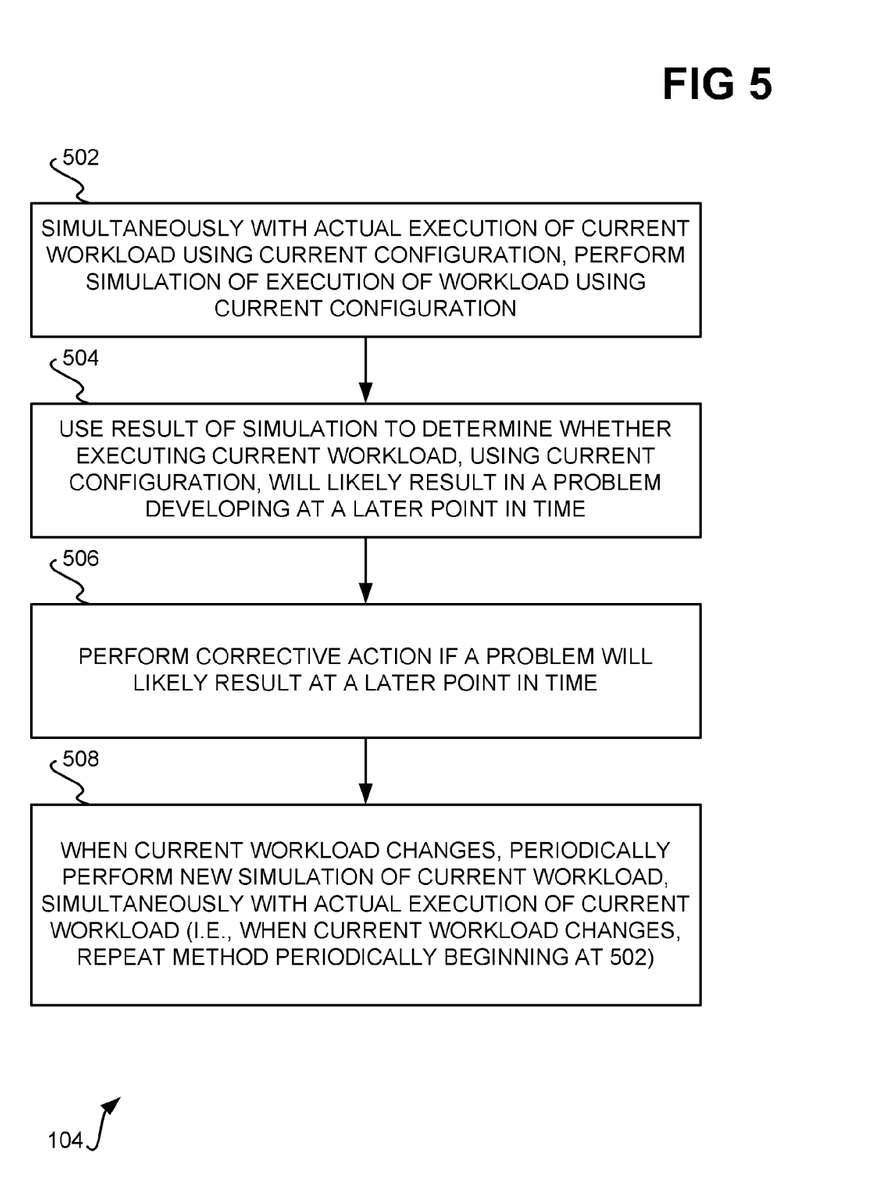
FIG. 5 is a flowchart of a method for determining whether executing a current workload of a database system, using a current configuration, will likely result in a problem developing at a later point in time, to implement the second part of FIG. 1, according to an embodiment of the present disclosure.

FIG. 5 shows a method for how whether executing the current workload of a database system, using the current configuration of the database system, will likely result in a problem developing at a later point in time, can be determined in part 104 of the method 100, according to an embodiment of the disclosure. Simultaneously with the actual execution of the current workload within the database system, using the current configuration of the database system, a simulation of the execution of the current workload within the database system, also using the current configuration, is performed (502). As noted above, the configuration of the database system can be generally defined as the number and type of queries that are permitted to run on the database system at any given time.

The manner by which the execution of the current workload is simulated using the current configuration of the database system is not limited by embodiments of the present disclosure. Representative examples of such simulation approaches include those described in the following two technical articles. The first technical article is S. Krompass, et al., "Dynamic workload management for very large data warehouses: juggling feathers and bowling balls," which appears in the Proceedings of the $33^{rd}$ International Conference on Very Large Databases, Sep. 23-28, 2007, pp. 1105-1115. The second technical article is O. Ozmen et al., "Storage workload estimation for database management systems," which appears in the Proceedings of the ACM SIGMOD International Conference on Management of Data, June 2007, pp. 377-388. In general, the simulation desirably results in a binary output indicating that a problem will likely develop in the actual execution of the current workload using the current configuration of the database system, or that a problem will not likely develop in the actual execution of the current workload using the current configuration of the database system.

It is noted that the simulation is performed simultaneously with the actual execution of the current workload within the database system using the current configuration. However, the simulation is performed much more quickly than the actual execution of the current workload within the database system using the current configuration. Therefore, problems that are likely to develop in the actual execution of the current workload using the current configuration will likely not occur before the simulation has finished.

For example, both the simulation and the actual execution may be started at time $t=0$. The simulation may be completed at time $t=5$, whereas actual execution may not be completed until time $t=80$. Therefore, if the simulation indicates that a problem is likely to occur at time $t=15$ during the actual execution, then the problem will not have occurred yet, because the simulation will have been completed by time $t=5$. As such, there is an opportunity to adjust how the actual execution of the current workload is progressing to stave off the likely problem from occurring.

As noted above, an example of such a problem occurring within a database system is database overload. An overload state can occur when a database system performs inefficiently because too many queries are being processed, or the workload is otherwise too heavy for the database system to efficiently process. An overload state can occur in other situations as well. That is, the examples provided herein are not intended to limit the types of situations in which an overload state of the database system occur.

As one example of when an overload state occurs, as more and more queries are processed on a database system, the number of queries the system processes per minute, as a measure of throughput, may increase at first, as resources become more fully utilized. However, once the database system is overloaded, attempting to process more queries causes throughput to decrease. This means that the database system completes fewer queries per minute in an overload state than in a non-overload state. It is noted that in an overload state of the database system, not all the resources used by the database may actually be overloaded. For example, a database systems hard disk drive resource may be overloaded, but queries that do not result in access of this resource may still be added without inordinately impacting the throughput of the database system as a whole, as is the case if queries that result in access of this resource are added. It is also possible in some database systems that the queries that do not result in access of the hard disk drive will still suffer from impaired throughput because they may be forced to wait for other queries that access both resources.

The result of the simulation is used to determine whether actual execution of the current workload, using the current configuration, will likely result in a problem, such as an overload situation in which the database system is in an overload state, developing within the database system at a later point in time (504). As noted above, in one embodiment, the result of the simulation may be binary, indicating that a problem will likely occur, or that a problem will not likely occur. As such, a corrective action, particularly to the current configuration of the database system, may be performed if a problem is likely to result at a later point in time (506).

A new simulation of the current workload of the database system is periodically performed (508). A new simulation is particularly performed when the current workload changes, as may be detected by performing part 102 of the method 100 as has been described above, or when the mix of queries to be processed by the database system is known to have changed, such as at the start or end of a discrete collection of such queries. In such instance, then, the method of FIG. 5 is repeated beginning at part 502. Performing a new simulation ensures that even if the current workload changes, such changes will not result in a problem developing within the database system during execution of the changed workload.

Figure 6:
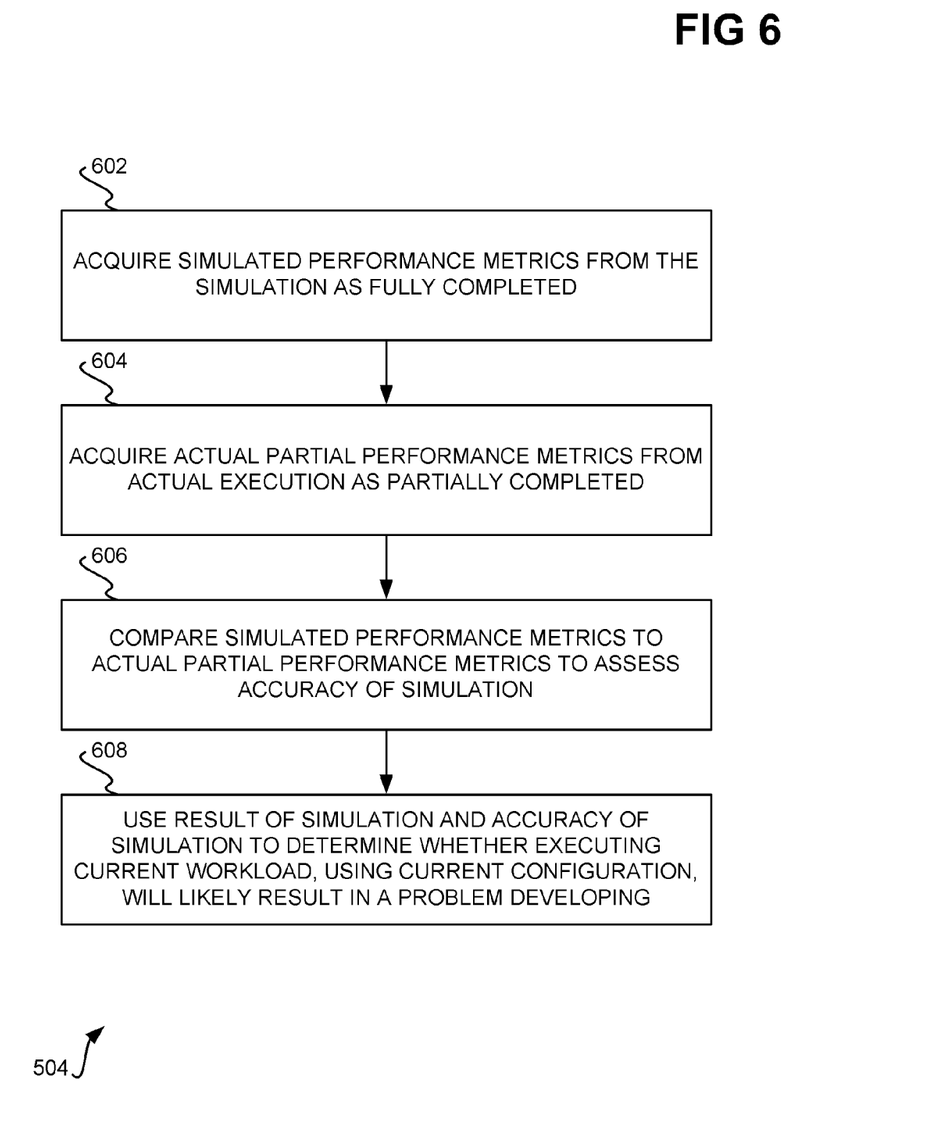
FIG. 6 is a flowchart of a method for using the result of a simulation to determine whether executing a current workload, using a current configuration, will likely result in a problem developing at a later point in time, to implement a part of FIG. 5, according to an embodiment of the present disclosure.

FIG. 6 shows a method for how the result of the simulation can be used to determine whether actual execution of the current workload, using the current configuration, will likely result in a problem developing at a later point in time, in part 504 of the method of FIG. 5, according to an embodiment of the disclosure. As has been noted above, the simulation result may be binary, indicating that a problem will likely develop, or indicating that a problem will not likely develop. Nevertheless, the accuracy of this result may be suspect. The method of FIG. 6 thus permits the accuracy of the result to temper whether the result is followed to conclude that the actual execution of the current workload, using the current configuration, will likely result in a problem developing.

One or more simulated performance metrics are acquired from the simulation (602), upon full completion of the simulation. Such simulated performance metrics can include, for instance, predicted resource utilization rates at each of a number of time intervals of the simulation. Likewise, one or more actual, but partial, performance metrics are acquired from the actual execution of the current workload (604), as partially completed. These performance metrics are partial in that the actual execution of the current workload has only been partially completed by the time the simulation has been fully completed. Such actual performance metrics can include, for instance, actual resource utilization rates at each of a number of time intervals that the actual execution has completed thus far.

For example, both the simulation and the actual execution may be started at time t=0. The simulation may be completed at time t=5, whereas actual execution may not be completed until time t=80. Therefore, while there are simulated performance metrics projected for each time interval from t=0 to t=80, when the simulation is completed, there are just actual performance metrics for each time interval from t=0 to t=5. Nevertheless, the simulated performance metrics for the time intervals from t=0 to t=5 can be compared to the actual performance metrics for the time intervals from t=0 to t=5 to determine the accuracy of the simulation as compared to the actual execution, at least partially.

As such, the simulated performance metrics are compared to the actual performance metrics to assess the accuracy of the simulation (606). For example, for the time periods of the actual execution of the current workload thus far, the simulated performance metrics can be compared to the actual performance metrics for these time periods. How close each simulated performance metric for a given time period is to the actual performance metric for this time period may be determined. The average of such a closeness measure over all the time periods of the actual execution of the current workload thus far can then be used as a measure of accuracy of the simulation.

For example, the actual execution may be at time t=5 when the simulation is completed. For each of the time periods t=0, t=1, ..., t=5, a closeness measure of the simulated performance metric to the actual performance metric may be determined as $$c = 1 - \frac{|p_a - p_s|}{p_a},$$

where $p_a$ is the actual performance metric for a given time period, and $p_s$ is the simulated performance metric for a given time period. The closeness measure c is a value from zero to one, where the higher the value, the closer the simulated performance metric $p_s$ is to the actual performance metric $p_a$. Thus, averaging all the closeness measures c over the time periods results in a measure of accuracy of the simulation. Other measures of variance can alternatively or also be employed. For example, a conventional statistical measure of variance is $$c = \frac{\sum (p_a - p_s)^2}{n - 1},$$

where n is the total number of samples or measures of the performance metric in question.

The result of the simulation is then used together with the accuracy of the simulation to determine whether actual execution of the current workload, using the current configuration, will ultimately likely result in a problem developing within the database system (608). For example, the result of the simulation may be zero if no problem is likely to occur, and one if a problem is likely to occur. By comparing the product of this result and the accuracy against a threshold, it can be determined whether or not a problem will likely result in such a way that takes into account the accuracy of the simulation.

For example, if the result of the simulation is one, indicating that a problem is likely to occur, and the accuracy is 70%, then the product of these two values is 70%. If the threshold is 60%, then part 608 concludes, in a way that takes into account the accuracy of the simulation, that a problem is likely to occur within the database system. By comparison, if the threshold is 80%, then part 608 concludes that a problem is not likely to occur within the database system, even though the result of the simulation is that a problem is likely to occur. This latter situation stems from the fact that even though the result of the simulation is that a problem is likely to occur, the accuracy of this result is not great enough to warrant concluding that a problem is indeed likely to occur.

Figure 7:
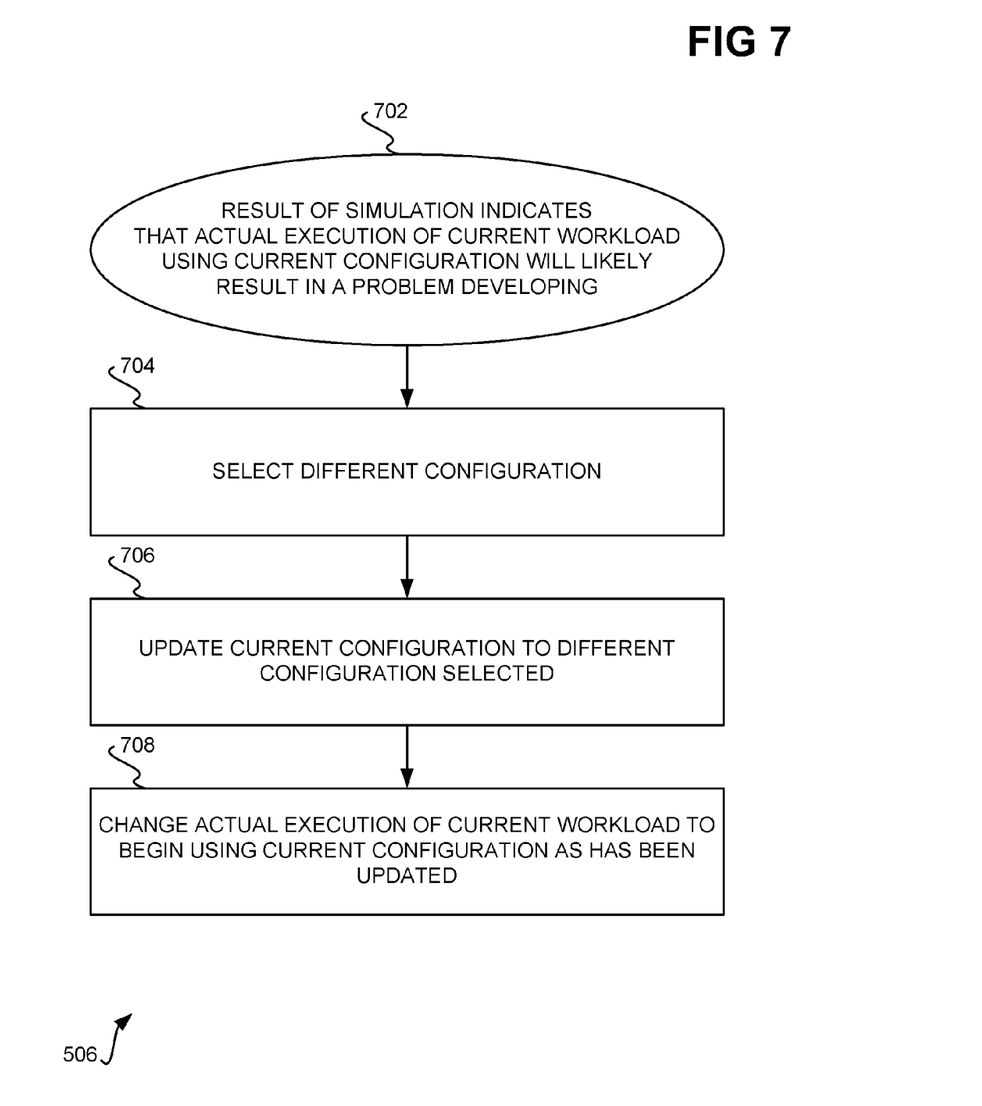
FIG. 7 is a flowchart of a method for performing a corrective action if it is determined that a problem will likely result at a later point in time during execution of a current workload, using a current configuration, to implement a different part of FIG. 5, according to an embodiment of the present disclosure.

FIG. 7 shows a method for how a corrective action can be performed in part 506 of the method of FIG. 5 if it is determined that a problem will likely result at a later point in time, according to an embodiment of the disclosure. As such, the method of FIG. 7 begins with the assumption that the result of the simulation indicates that the actual execution of the current workload, using the current configuration, will likely result in a problem developing (702). Alternatively, where the method of FIG. 6 has been performed, the assumption in part 702 is that it has been concluded that the actual execution of the current workload, using the current configuration, will likely result in a problem developing, taking into account both the result of the simulation and its accuracy.

In such instances, a different configuration of the database system is selected (704). For example, as noted above, the current configuration may be that a certain number X of register queries are permitted to run at the same time as a certain number Y of report queries. Since it is known that this current configuration will likely result in a problem developing within the database system at a later point in time during execution of the current workload, an alternative configuration is selected. For example, the limits of the various queries that are permitted to run at the same time may be reduced by 10% each. As such, the alternative query can be that just 90% of the certain number X of register queries are permitted to run at the same time as just 90% of the certain number Y of report queries. The underlying principle here is thus to select an alternative configuration that desirably will prevent the problem that has been determined as likely to occur from occurring.

The current configuration is therefore updated to so that the current configuration is now the different configuration that has been selected (706). The actual execution of the current workload is then changed to begin using the current configuration as has been updated (708), as opposed to the current configuration prior to being updating and on which basis actual execution of the current workload has proceeded thus far. It is noted that due to changing the actual execution of the current workload to use the configuration as updated, the method of FIG. 5 may be subsequently repeated, so that this newly changed actual execution of the current workload can be simulated. Such simulation ensures that the current configuration has been appropriately updated in a way that the problem that previously has been determined as likely to occur will in fact not occur, and in a way that no other problem will likely occur.

Figure 8:
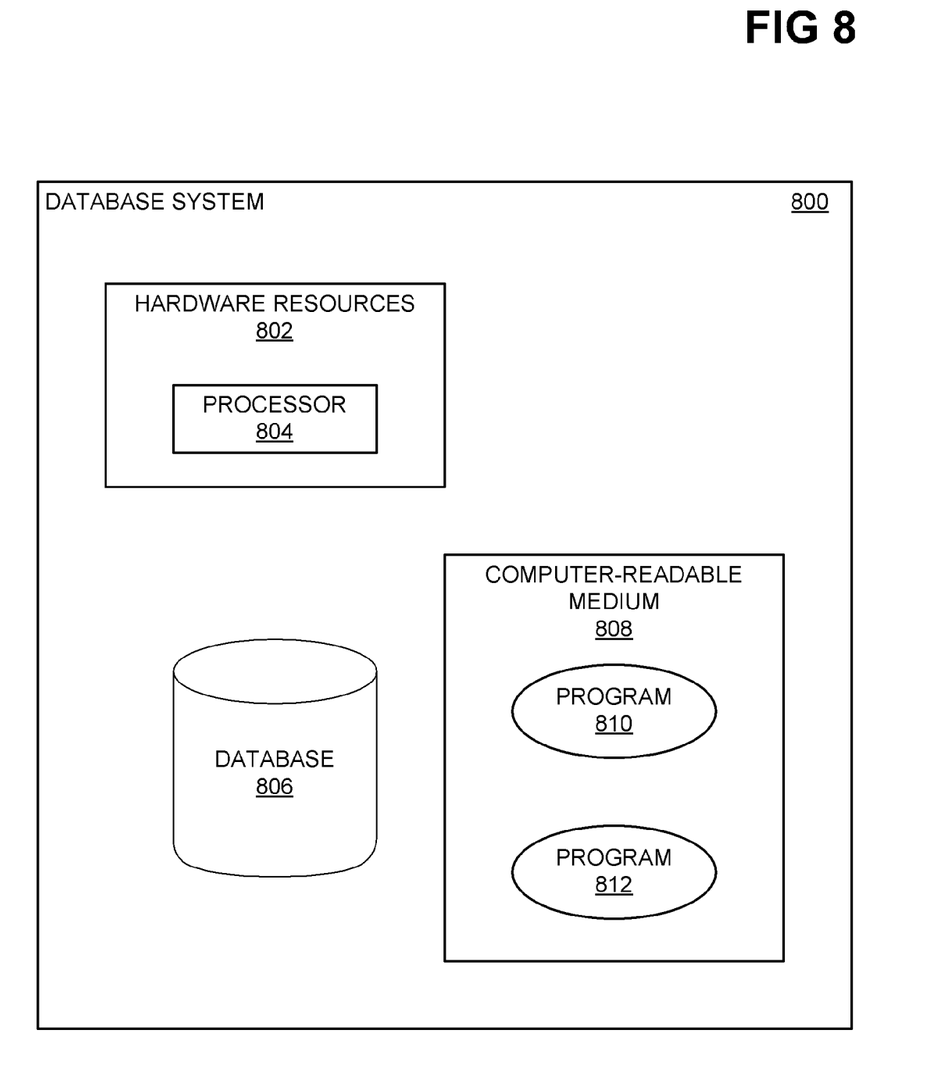
FIG. 8 is a diagram of a representative database system, according to an embodiment of the present disclosure.

In conclusion, FIG. 8 shows a database system 800 in conjunction with which the methods that have been described above may be implemented according to an embodiment of the disclosure. The system 800 may be implemented over one or more computing devices in one embodiment. In the case where the system 800 is implemented via more than one computing device, the computing devices may be communicatively connected to one another over a network.

The system 800 includes hardware resources 802, including a processor 804, as well as a database 806 and a computer-readable medium 808 that stores computer programs 810 and 812. The processor 804 executes the computer programs 810 and 812. The database 806 has a workload and a current configuration, as has been described. The workload is executed against the database 806 in its current configuration, using the hardware resources 802. Besides the processor 804, the hardware resources 802 can include additional processors, as well as storage devices and other types of hardware resources. Examples of storage devices include volatile storage devices, like dynamic random access memory, and non-volatile storage devices, like hard disk drives and non-volatile semiconductor memory. The computer-readable medium 312 may be one of these storage devices in one embodiment as well.

The processor 804 executes the computer program 810 to determine whether a change in the workload of the database 806 has occurred. As such, the computer program 810 performs part 102 of the method 100, and in this respect can perform the methods of FIGS. 2, 3, and/or 4. By comparison, the processor 804 executes the computer program 812 to determine whether executing the current workload of the database 806, using the current configuration of the database 806, will likely result in a problem developing within the database 806 at a later point in time. As such, the computer program 812 performs part 104 of the method 100, and in this respect can perform the methods of FIGS. 5, 6, and/or 7.

We claim:

1. A method comprising:
   determining whether a change in workload of a database system having a plurality of resources has occurred, comprising:
   formulating one or more investigative queries, each investigative query adapted to test one of a different resource of the database system and a different combination of resources of the database system, and is not explicitly adapted to return desired data from the database system;
   running the investigative queries on the database system when the database system is in an unloaded state to acquire one or more unloaded performance metrics of the database system corresponding to the resources tested by the investigative queries;
   running the investigative queries on the database system when the database system is in a loaded state to acquire one or more loaded performance metrics of the database system corresponding to the resources tested by the investigative queries; and,
   determining whether executing a current workload of the database system, using a current configuration of the database system, will likely result in a problem developing with the database system at a later point in time, comprising:
   simultaneously with actual execution of the current workload on the database system using the current configuration, performing a simulation of execution of the current workload on the database system using the current configuration, where the simulation of execution is performed more quickly than the actual execution.

2. The method of claim 1, wherein the unloaded performance metrics comprise unloaded resource usage rates, and the loaded performance metrics comprise loaded resource usage rates.

3. The method of claim 1, wherein determining whether the change in the workload of the database system has occurred further comprises:
   using the unloaded performance metrics and the loaded performance metrics to determine whether the change in the workload of the database system has occurred.

4. The method of claim 3, wherein using the unloaded performance metrics and the loaded performance metrics to determine whether the change in the workload has occurred comprises, for the resource tested by each investigative query:
   determining a current ratio of the loaded performance metric to the unload performance metric;
   determining a difference between the current ratio and a prior ratio; and,
   using the difference to determine whether the change in the workload of the database system has occurred or appears to be occurring.

5. The method of claim 4, wherein using the difference to determine whether the change in the workload of the database system has occurred or appears to be occurring comprises:
   where the difference is greater than a first threshold but not greater than a second threshold greater than the first threshold, alerting a user that the change in the workload of the database system appears to be occurring; and, where the difference is greater than the second threshold, alerting the user that the change in the workload of the database system has occurred.

6. The method of claim 4, wherein the prior ratio is equal to one of:
a value of one;
a ratio of the loaded performance metric to the unloaded performance metric that was previously determined.

7. The method of claim 3, wherein using the unloaded performance metrics and the loaded performance metrics to determine whether the change in the workload has occurred comprises:
comparing the unloaded performance metrics to the loaded performance metrics within a database robustness map to determine whether the change in the workload of the database system has occurred.

8. The method of claim 3, wherein using the unloaded performance metrics and the loaded performance metrics to determine whether the change in the workload has occurred comprises:
training a machine learning system using a plurality of training queries and a plurality of performance metrics of the database system corresponding to the training queries;
after training the machine learning system,
inputting the unloaded performance metrics and the loaded performance metrics into the machine learning system; and,
receiving as output from the machine learning system whether the change in the workload of the database system has occurred.

9. The method of claim 1, wherein determining whether the change in the workload of the database system has occurred further comprises:
periodically rerunning the investigative queries on the database system to acquire one or more updated loaded performance metrics corresponding to the resources tested by the investigative queries,
wherein the investigative queries are run on the database system when the database system is in the unloaded state just a single time.

10. The method of claim 1, wherein determining whether executing the current workload of the database system, using the current configuration, will likely result in a problem developing with the database system at a later point in time further comprises:
using a result of the simulation to determine whether executing the current workload of the database system, using the current configuration, will likely result in a problem developing with the database system at a later point in time.

11. The method of claim 10, wherein determining whether executing the current workload of the database system, using the current configuration, will likely result in a problem developing with the database system at a later point in time further comprises:
where a result of the simulation indicates that the actual execution of the current workload on the database system using the current configuration will likely result in a problem developing with the database system at a later point in time,
selecting a different configuration of the database system;
updating the current configuration to the different configuration selected; and,
changing the actual execution of the current workload on the database system to begin using the current configuration as has been updated.

12. The method of claim 10, wherein using the result of the simulation to determine whether executing the current workload of the database system, using the current configuration, will likely result in a problem developing with the database system at a later point in time comprises:
acquiring one or more simulated performance metrics from the simulation of the execution as fully completed;
acquiring one or more actual partial performance metrics of the actual execution, from the actual execution as partially completed;
comparing the simulated performance metrics to the actual partial performance metrics to assess an accuracy of the simulation;
using a result of the simulation and the accuracy of the simulation to determine whether executing the current workload of the database system, using the current configuration, will likely result in a problem developing with the database system at a later point in time.

13. The method of claim 1, wherein determining whether executing the current workload of the database system, using the current configuration, will likely result in a problem developing with the database system at a later point in time further comprises:
periodically performing a new simulation of execution of the current workload on the database system, simultaneously with the actual execution of the current workload on the database system, where the new simulation of execution is performed more quickly than the actual execution.

14. A database system comprising:
a plurality of hardware resources, including a processor;
a database having a workload and a current configuration, the workload executed against the database in the current configuration of the database, using the hardware resources; and,
a computer-readable medium to store a first computer program and a second computer program for execution by the processor,
wherein the first computer program is to determine whether a change in the workload of the database has occurred, by running one or more investigative queries on the database in an unloaded state and running the investigative queries on the database in a loaded state,
where each investigative query is to test one of a different hardware resource and a different combination of hardware resources, and is not explicitly adapted to return desired data from the database,
where running the investigative queries on the database in the unloaded state results in acquisition of one or more unloaded performance metrics of the database corresponding to the hardware resources tested by the investigative queries,
where running the investigative queries on the database in the loaded state results in acquisition of one or more loaded performance metrics of the database corresponding to the hardware resources tested by the investigative queries,
and wherein the second computer program is to determine whether executing the current workload of the database, using the current configuration of the database, will likely result in a problem developing with the database system at a later point in time,
by simultaneously with actual execution of the current workload on the database using the current configuration, performing a simulation of execution of the current workload on the database using the current configuration, where the simulation of execution is performed more quickly than the actual execution.

15. A computer-readable medium having a computer program stored thereon for execution by a processor to perform a method comprising:

determining whether a change in the workload of a database system having a plurality of resources has occurred, comprising:

formulating one or more investigative queries, each investigative query adapted to test one of a different resource and a different combination of resources of the database system, and is not explicitly adapted to return desired data from the database system;

running the investigative queries on the database system when the database system is in an unloaded state to acquire one or more unloaded performance metrics of the database system corresponding to the resources tested by the investigative queries;

running the investigative queries on the database system when the database system is in a loaded state to acquire one or more loaded performance metrics of the database system corresponding to the resources tested by the investigative queries; and, determining whether executing a current workload of the database system, using a current configuration of the database system, will likely result in a problem developing with the database system at a later point in time, comprising:

simultaneously with actual execution of the current workload on the database system using the current configuration, performing a simulation of execution of the current workload on the database system using the current configuration, where the simulation of execution is performed more quickly than the actual execution.

* * * * *